United States Patent
Kida et al.

(10) Patent No.: US 9,108,626 B2
(45) Date of Patent: Aug. 18, 2015

(54) CONTROL DEVICE FOR VEHICLE

(75) Inventors: Akihiro Kida, Toyota (JP); Masashi Takagi, Nagoya (JP); Michihito Shimada, Toyota (JP); Shinya Kodama, Toyota (JP); Motonari Obayashi, Susono (JP); Hiroshi Shimada, Mishima (JP); Takamasa Kitamura, Nagoya (JP); Akito Oonishi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/985,005

(22) PCT Filed: Apr. 21, 2011

(86) PCT No.: PCT/JP2011/059835
§ 371 (c)(1),
(2), (4) Date: Aug. 12, 2013

(87) PCT Pub. No.: WO2012/144050
PCT Pub. Date: Oct. 26, 2012

(65) Prior Publication Data
US 2014/0038774 A1 Feb. 6, 2014

(51) Int. Cl.
| | |
|---|---|
| *F16H 59/48* | (2006.01) |
| *B60W 10/11* | (2012.01) |
| *F02D 29/02* | (2006.01) |
| *F02D 41/02* | (2006.01) |
| *F02D 41/04* | (2006.01) |
| *F16H 61/02* | (2006.01) |
| *F16H 61/16* | (2006.01) |
| *B60W 10/184* | (2012.01) |
| *F02D 41/12* | (2006.01) |
| *F16H 59/18* | (2006.01) |
| *F16H 59/54* | (2006.01) |
| *F16H 63/50* | (2006.01) |

(52) U.S. Cl.
CPC ............ *B60W 10/11* (2013.01); *B60W 10/184* (2013.01); *F02D 29/02* (2013.01); *F02D 41/023* (2013.01); *F02D 41/045* (2013.01); *F16H 61/0213* (2013.01); *F16H 61/16* (2013.01); *F02D 41/12* (2013.01); *F02D 2200/602* (2013.01); *F16H 59/18* (2013.01); *F16H 59/54* (2013.01); *F16H 2063/508* (2013.01); *Y10T 477/649* (2015.01)

(58) Field of Classification Search
CPC . B60W 10/11; B60W 10/184; F16H 61/0213; F16H 61/16
USPC ........... 477/120, 98; 401/50; 180/65.1, 65.21, 180/65.265, 337, 338, 370
See application file for complete search history.

(56) References Cited

U.S. PATENT DOCUMENTS

| | | | | |
|---|---|---|---|---|
| 5,941,793 A | * | 8/1999 | Ito et al. .......................... | 477/120 |
| 2008/0177451 A1 | * | 7/2008 | Saitou et al. .................... | 701/55 |

(Continued)

FOREIGN PATENT DOCUMENTS

| | | |
|---|---|---|
| CN | 101529131 A | 9/2009 |
| JP | 2008-63953 A | 3/2008 |

*Primary Examiner* — David J Hlavka
(74) *Attorney, Agent, or Firm* — Sughrue Mion, PLLC

(57) ABSTRACT

When simultaneous depression of an accelerator pedal (2) and a brake pedal (4) is detected, an electronic control unit (1) inhibits a downshift of an automatic transmission (11) and performs output suppression control for an engine (6), thereby making it possible to suppress the increase of vehicle drive force caused by the downshift and maintain a constant vehicle deceleration rate by an easier operation.

4 Claims, 2 Drawing Sheets

(56) References Cited

U.S. PATENT DOCUMENTS

2009/0018732 A1* 1/2009 Choby et al. .................... 701/51
2010/0071987 A1* 3/2010 Hyodo et al. ................. 180/338
2010/0076652 A1 3/2010 Hyodo et al.
2011/0066350 A1* 3/2011 Sonoda et al. .................. 701/96

* cited by examiner

CONTROL DEVICE FOR VEHICLE

CROSS REFERENCE TO RELATED APPLICATIONS

This application is a National Stage of International Application No. PCT/JP2011/059835 filed Apr. 21, 2011, the contents of which are incorporated herein by reference in their entirety.

FIELD OF THE DISCLOSURE

The present invention relates to a control device for a vehicle to be applied to a vehicle that acquires drive force by transmitting output of its drive source to drive wheels via a transmission.

BACKGROUND OF THE DISCLOSURE

A control device for a vehicle is known in the prior art that outputs, in response to simultaneous operation of the accelerator and the brake, a throttle-off signal to reduce the output of the engine, which is a drive source of the vehicle, thereby ensuring the vehicle stability and protection of the engine and the power train, as shown in Patent Document 1, for example.

PRIOR ART DOCUMENTS

Patent Documents

Patent Document 1: Japanese Laid-Open Patent Publication No. 2008-063953

SUMMARY OF THE INVENTION

Problems that the Invention is to Solve

Such a control device for a vehicle allows a relatively small amount of brake operation to work the brakes because it reduces the engine output to reduce the drive force of the vehicle in response to simultaneous operation of the accelerator and the brake. However, if an automatic transmission is downshifted in accordance with decrease in the vehicle speed, the reduction ratio of the power train decreases, resulting in increase in the drive force of the vehicle. Consequently, in order to keep a constant rate of the vehicle deceleration, the brake operation amount should be increased in response to the downshift.

Accordingly, it is an objective of the present invention to provide a control device for a vehicle that simplifies a driver's operation to keep a constant rate of vehicle deceleration during simultaneous operation of the accelerator and the brake.

Means for Solving the Problems

To achieve the foregoing objective, the present invention provides a control device for a vehicle, to be applied to a vehicle that acquires drive force by transmitting output of a drive source to a drive wheel via a transmission. Downshifting of the transmission is limited in response to simultaneous operation of an accelerator and a brake.

Thus, according to the invention, downshifting the transmission is limited in response to simultaneous operation of the accelerator and the brake, to suppress an increase in the drive force of the vehicle, which could be caused by a downshift. Consequently, a driver can, by a simpler operation, keep a constant rate of vehicle deceleration during simultaneous operation of the accelerator and the brake.

The limitation of downshift may be achieved by inhibiting the transmission from being shifted down or by shifting a downshift line for the transmission to a lower-speed side.

In this context, it is desirable to perform output reducing control for the drive source of the vehicle in response to simultaneous operation of the accelerator and the brake in order to further reduce the amount of brake operation required for braking the vehicle. Also in this case, the reduction of drive source output to be imposed by the output reducing control can be smaller if the output reducing control for the drive source is executed after executing the limitation of downshifts of the transmission.

Further, in order to solve the above problem, another invention as a control device for a vehicle to be applied to a vehicle that acquires drive force by transmitting output of its drive source to a drive wheel via a transmission performs a forcible upshift of the transmission in response to simultaneous operation of the accelerator and the brake.

Thus, according to the invention, a forcible upshift of the transmission is performed in response to simultaneous operation of the accelerator and the brake so as to reduce the drive force of the vehicle. Consequently, there is no need to perform the reducing control of the drive source output in conjunction with a downshift involving increase in vehicle drive force. Therefore, the braking performance of the vehicle during the simultaneous operation of the accelerator and the brake can be achieved by a simpler control mechanism.

In order to further reduce the amount of brake operation required for braking the vehicle it is desirable to perform the output reducing control for the drive source of the vehicle in response to simultaneous operation of the accelerator and the brake. Also in this case, if the output reducing control for the drive source is executed after performing an upshift of the transmission, the reduction of drive source output to be imposed by the output reducing control can be smaller.

DETAILED DESCRIPTION OF THE PREFERRED EMBODIMENTS

First Embodiment

Figure 1:
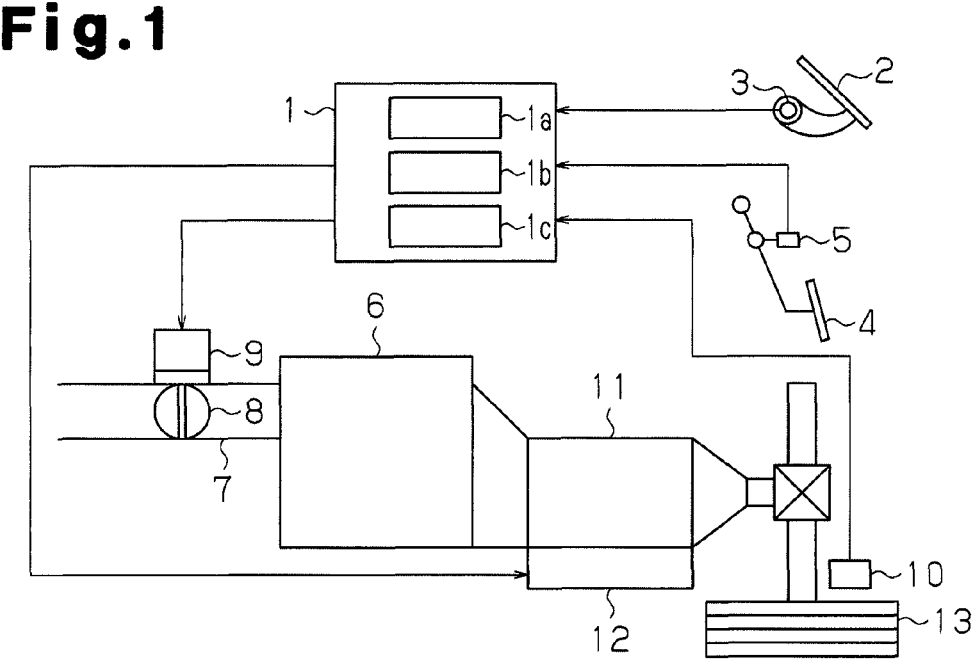
FIG. 1 is a schematic diagram showing a general configuration of a control device for a vehicle according to a first embodiment of the present invention.
Figure 2:
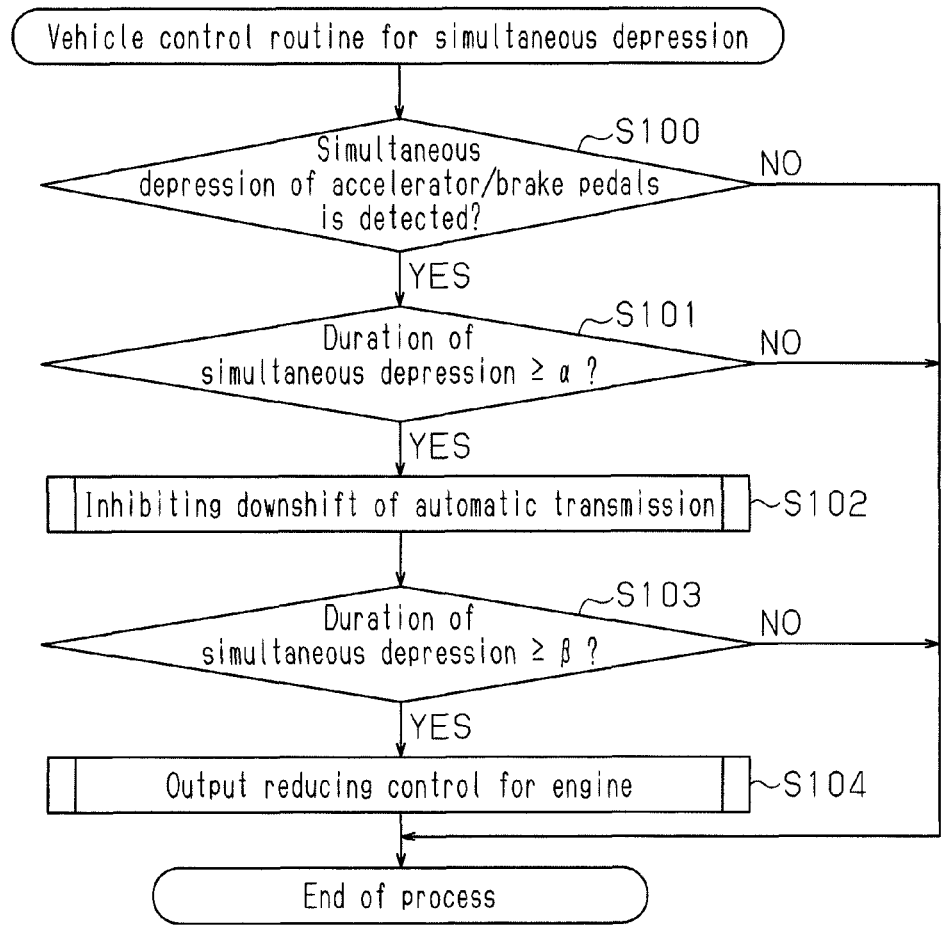
FIG. 2 is a flowchart showing a process of a vehicle control routine to be applied to the first embodiment during simultaneous depression.

Hereinafter, a control device for a vehicle according to a first embodiment of the present invention will be described with reference to FIGS. 1 and 2. The control device of the present embodiment is applied to a vehicle that acquires drive force by transmitting output of an engine as a drive source to the drive wheels via an automatic transmission.

First, the structure of the control device for a vehicle according to the present embodiment will be explained with reference to FIG. 1. As shown in the drawing, the control device for a vehicle according to the present embodiment is configured mainly of an electronic control unit 1. The electronic control unit 1 includes a central processing unit (CPU) 1a for performing various operations related to vehicle control, a read-only memory (ROM) 1b storing control programs and data, and a random access memory (RAM) 1c for temporarily storing operation results from the CPU 1a and detection results from sensors.

Sensors and switches provided at various parts of the vehicle are connected to the electronic control unit 1. The sensors and switches include an accelerator pedal sensor 3 for detecting the depressed amount of an accelerator pedal 2 (accelerator operation amount), a stop lamp switch 5 for turning on stop lamps in response to depression of a brake pedal 4 (brake operation), a speed sensor 10 for detecting vehicle speed, and the like. Further, actuators provided for various parts of the vehicle are connected to the electronic control unit 1. The actuators include a throttle motor 9 for driving a throttle valve 8 for engine power control provided on an intake passage 7 of an engine 6 as a drive source of the vehicle. Moreover, a hydraulic circuit 12 for an automatic transmission 11 provided between the engine 6 and drive wheels 13 is connected to the electronic control unit 1.

In the vehicle thus configured, the electronic control unit 1 grasps the operational status of the vehicle from the detection results from various sensors and switches. The electronic control unit 1 then controls the vehicle by outputting command signals to various actuators based on the grasped operational status of the vehicle. By way of example, the electronic control unit 1 performs upshift/downshift control for the automatic transmission 11 based on the vehicle speed and the depressed amount of the accelerator pedal 2.

Further, during simultaneous depression of the accelerator pedal 2 and the brake pedal 4, i.e., during simultaneous operation of the accelerator and the brake, the electronic control unit 1 performs output reducing control for the engine 6 as part of vehicle control. The output reducing control for the engine 6 at such times is used for reducing the drive force of the vehicle to be less than the braking force of the vehicle to ensure braking performance without driver's strong depression of the brake pedal 4.

In the present embodiment, the output reducing control for the engine 6 at such times is performed in the following manner. That is, in the present embodiment, when simultaneous depression of the accelerator pedal 2 and the brake pedal 4, i.e., simultaneous operation of the accelerator and the brake is detected, the electronic control unit 1 overwrites the detected value of the depressed amount of the accelerator pedal 2 from the accelerator pedal sensor 3 with a value less than the actual value. The electronic control unit 1 then controls the throttle motor 9 based on the overwritten value, thus reducing an opening of the throttle valve 8, thereby reducing the output of the engine 6.

If the automatic transmission 11 is downshifted due to the decrease in vehicle speed while the output reducing control for the engine 6 is being executed in response to simultaneous operation of the accelerator and the brake as described above, the reduction ratio of the power train decreases so that the drive force of the vehicle is increased. Consequently, in order to keep a constant rate of vehicle deceleration, the brake operation amount should be increased in response to the downshift.

Therefore, in the present embodiment, during simultaneous depression of the accelerator pedal 2 and the brake pedal 4, downshifting of the automatic transmission 11 is limited in order to ensure the braking performance of the vehicle. Specifically, the electronic control unit 1 inhibits the automatic transmission 11 from being downshifted when simultaneous depression of the accelerator pedal 2 and the brake pedal 4 (simultaneous operation of the accelerator and the brake) is detected.

The vehicle control thus performed during simultaneous depression of the accelerator pedal 2 and the brake pedal 4 in the present embodiment will be described with reference to FIG. 2. The vehicle control routine for simultaneous depression shown in the drawing is periodically executed repeatedly by the electronic control unit 1 while the vehicle is moving.

When the present routine is initiated, it is first determined at step S100 whether simultaneous depression of the accelerator pedal 2 and the brake pedal 4, i.e., simultaneous operation of the accelerator and the brake is detected or not. If simultaneous depression is not detected (S100: NO), the process for this cycle of the present routine is ended without further processing.

If simultaneous depression is detected (S100: YES), it is determined at step S101 whether the duration of the simultaneous depression is equal to or more than a prescribed determination value $\alpha$. If the duration is less than the determination value $\alpha$ (S101: NO), the process for this cycle of the present routine is also ended without further processing.

In contrast, if the duration of the simultaneous depression is equal to or more than the determination value $\alpha$ (S101: YES), the automatic transmission 11 is inhibited from being downshifted at step S102. Thereafter, the process proceeds to the subsequent step S103.

When the process proceeds to step S103, it is determined at step S103 whether the duration of the simultaneous depression is equal to or more than a prescribed determination value $\beta$, which is greater than the determination value $\alpha$. If the duration is less than the determination value $\beta$ (S103: NO), the process for this cycle of the present routine is ended without further processing, or otherwise (S103: YES), the output reducing control for the engine 6 is executed at the subsequent step S104. Then, the output reducing control for the engine 6 thus executed will be ended upon satisfaction of conditions for return such as an end of the simultaneous depression of the accelerator pedal 2 and the brake pedal 4 or a sufficient reduction of vehicle speed. Also, the inhibition of downshifts of the automatic transmission 11 will be cancelled upon satisfaction of such conditions for return.

The present embodiment as thus far described provides the following advantages.

(1) In the present embodiment, the automatic transmission 11 is inhibited from being downshifted during simultaneous operation of the accelerator and the brake. Consequently, the increase in drive force, which could otherwise be caused by a downshift of the automatic transmission 11, is prevented. Thus, the control device for a vehicle according to the present embodiment simplifies a driver's operation for keeping a constant rate of vehicle deceleration during simultaneous operation of the accelerator and the brake.

(2) As a result of preventing the increase in drive force, which could otherwise be caused by a downshift of the automatic transmission 11, the initiation of the output reducing control for the engine 6 is delayed, and the reduction of engine output to be imposed by the output reducing control becomes smaller.

(3) Since the output reducing control for the engine 6 is executed after inhibiting downshift to prevent increase in drive force of the vehicle, which could otherwise be caused by a downshift, the reduction of engine output to be imposed by the output reducing control is made smaller.

Second Embodiment

A control device for a vehicle according to a second embodiment of the present invention will now be described with reference to FIG. 3. In any of the present embodiment and the following embodiments, the components in common with those of the first embodiment are designated by the same reference numerals, and detailed description thereof will be omitted.

In the first embodiment, during simultaneous operation of the accelerator and the brake, the automatic transmission 11 is inhibited from being downshifted in order to ensure the braking performance of the vehicle. However, even without completely inhibiting downshifts of the automatic transmission 11, it is possible to suppress the increase in vehicle drive force caused by a downshift if downshifts are partially limited.

Accordingly, in the present embodiment, the downshift lines for the automatic transmission 11 are shifted to the lower-speed side in response to simultaneous operation of the accelerator and the brake, to suppress the increase in drive force, which could be caused by downshift.

Figure 3:
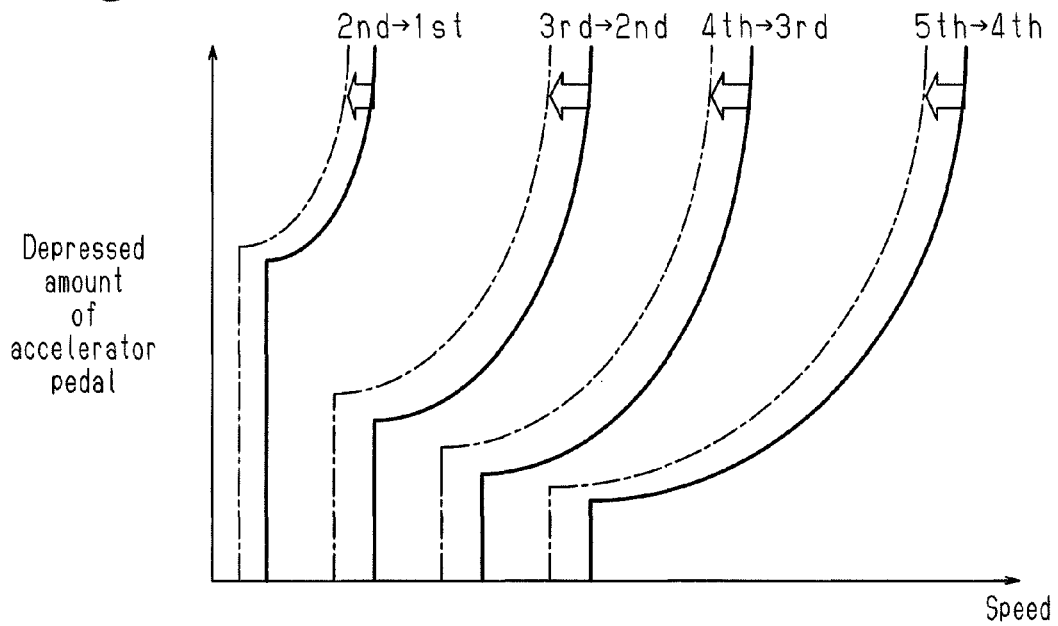
FIG. 3 is a graph showing settings of downshift lines for an automatic transmission according to a second embodiment of the present invention.

The downshift lines for various gear positions used in normal driving condition of the vehicle are set in the mode as shown by the solid lines in FIG. 3. In contrast, during simultaneous depression of the accelerator pedal 2 and the brake pedal 4, the downshift lines are shifted to the lower-speed side as shown by lines formed by a long dash alternating with a short dash in FIG. 3.

In the present embodiment thus configured, during simultaneous operation of the accelerator and the brake, downshifting of the automatic transmission 11 is inhibited until the vehicle speed drops to be lower than the speed in normal driving condition. Therefore, the control device for a vehicle according to the present embodiment also provides the advantages equivalent to those in above (1) to (3).

Third Embodiment

Figure 4:
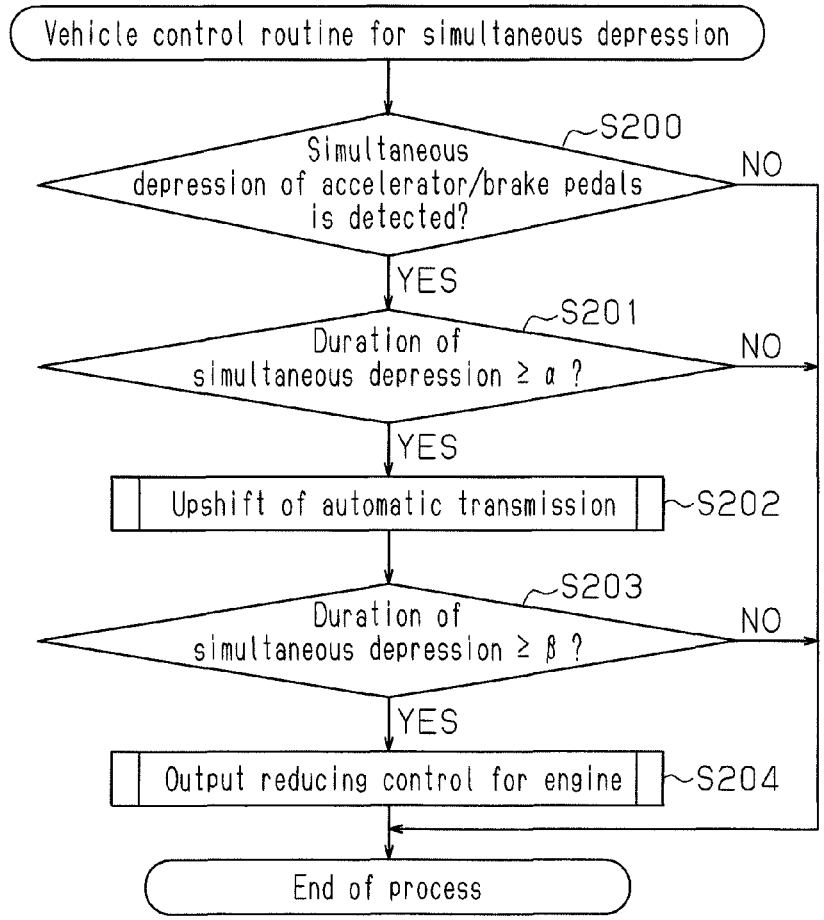
FIG. 4 is a flowchart showing a process of a vehicle control routine to be applied to a third embodiment of the present invention during simultaneous depression.

Next, a control device for a vehicle according to a third embodiment of the present invention will be described with reference to FIG. 4.

In any of the above embodiments, downshifting the transmission is limited. In contrast, in the present embodiment, a forcible upshift of the automatic transmission 11 is performed in response to simultaneous operation of the accelerator and the brake.

The vehicle control thus performed during simultaneous depression of the accelerator pedal 2 and the brake pedal 4 in the present embodiment will be described with reference to FIG. 4. The vehicle control routine for simultaneous depression, shown in the drawing, is periodically executed repeatedly by the electronic control unit 1 while the vehicle is moving.

When the present routine is initiated, it is first determined at step S200 whether simultaneous depression of the accelerator pedal 2 and the brake pedal 4 is detected or not. If simultaneous depression is not detected (S200: NO), the process for this cycle of the present routine is ended without further processing.

If simultaneous depression is detected (S200: YES), it is determined at step S201 whether the duration of the simultaneous depression is equal to or more than a prescribed determination value $\alpha$. If the duration is less than the determination value $\alpha$ (S201: NO), the process for this cycle of the present routine is also ended without further processing.

In contrast, if the duration of the simultaneous depression is equal to or more than the determination value $\alpha$ (S201: YES), a forcible upshift of the automatic transmission 11 is performed, at step S202. Thereafter, the process proceeds to the subsequent step S203.

When the process proceeds to step S203, it is determined at step S203 whether the duration of the simultaneous depression is equal to or more than a prescribed determination value $\beta$, which is greater than the determination value $\alpha$. If the duration is less than the determination value $\beta$ (S203: NO), the process for this cycle of the present routine is ended without further processing, or otherwise (S203: YES), the output reducing control for the engine 6 is executed at the subsequent step S204. Then the output reducing control for the engine 6 thus executed is ended upon satisfaction of conditions for return such as an end of the simultaneous depression of the accelerator pedal 2 and the brake pedal 4 or a sufficient reduction of vehicle speed. Also, the upshift/downshift control for the automatic transmission 11 will be returned to normal upon satisfaction of such conditions for return.

In the present embodiment thus configured, forcible upshift of the automatic transmission 11 is performed in response to simultaneous depression of the accelerator pedal 2 and the brake pedal 4. Then, due to the upshift thus performed, the reduction ratio of the power train increases, resulting in a decrease in the drive force of the vehicle. Thus, the increase in the drive force, which could be caused by downshift, will be suppressed. Consequently, the driver can, by a simpler operation, keep a constant rate of vehicle deceleration during simultaneous operation of the accelerator and the brake.

Any of the embodiments as thus far described may be modified as follows.

In the second embodiment, the downshift lines are shifted to the lower-speed side to suppress downshifts of the automatic transmission 11. However, downshifting may be limited, for example, by performing downshifts after a delay of a predetermined length of time, and thereby the increase in vehicle drive force, involved therewith, can be also suppressed.

In the above embodiments, the output reducing control for the engine 6 is executed after executing the limitation of downshifts or executing forcible upshift. However, the output reducing control for the engine 6 may be executed either simultaneously with or before the execution of the limitation of downshifts or the execution of a forcible upshift, if necessary.

In the above embodiments, the depressed amount of the accelerator pedal is overwritten to reduce the opening of the throttle valve 8, resulting in reduction in the engine output. However, the reduction in the engine output may be achieved by any other control method for the engine, such as reduction in fuel injection quantity or retarding of ignition timing.

In the above embodiments, the output reducing control for the engine 6 is executed during simultaneous operation of the accelerator and the brake. However, the output reducing control at such times may be omitted.

In the above embodiments, an accelerator operation and a brake operation are achieved by depression of the accelerator pedal 2 and the brake pedal 4. However, an accelerator operation and a brake operation may be achieved by any other operation method than pedal depression. Possible operation methods other than pedal depression include a manual operation via paddle shift and an operation by voice commands, for example.

In the above embodiments, a case is described in which the present invention is applied to a vehicle having a multistage-type automatic transmission as its transmission. However, the present invention may be applied to a vehicle having any other type of transmission such as a continuously variable transmission.

In the above embodiments, a case is described in which a control device of the present invention is applied to a vehicle having the engine 6 as its drive source. However, the present invention may be applied to an electric vehicle having a motor as its drive source and a hybrid vehicle having an engine and a motor as its drive sources as well.

DESCRIPTION OF THE REFERENCE NUMERALS

1 . . . Electronic control unit (1*a* . . . Central Processing Unit (CPU), 1*b* . . . Read-Only Memory (ROM), 1*c* . . . Random Access Memory (RAM)), 2 . . . Accelerator pedal, 3 . . . Accelerator pedal sensor, 4 . . . Brake pedal, 5 . . . Stop lamp switch, 6 . . . Engine, 7 . . . Intake passage, 8 . . . Throttle valve, 9 . . . Throttle motor, 10 . . . Speed sensor, 11 . . . Automatic transmission (Transmission), 12 . . . Hydraulic circuit, 13 . . . Drive wheel.

The invention claimed is:

1. A control device for a vehicle, to be applied to a vehicle that acquires drive force by transmitting output of a drive source to a drive wheel via a transmission, the control device comprising:
 a processor circuit configured to execute downshifting of the transmission, wherein the downshifting is limited in response to simultaneous operation of an accelerator and a brake,
 wherein the processor circuit is configured to reduce the output of the drive source after execution of the limitation of downshift.

2. The control device for a vehicle, according to claim 1, wherein the processor circuit is configured to achieve the limitation of downshift by inhibiting the transmission from being shifted down.

3. The control device for a vehicle, according to claim 1, wherein the processor circuit is configured to achieve the limitation of downshift by shifting a downshift line for the transmission to a lower-speed side.

4. A control device for a vehicle to be applied to a vehicle that acquires drive force by transmitting output of a drive source to a drive wheel via a transmission, the control device comprising:
 a processor circuit configured to execute a forcible upshift of the transmission, wherein the upshift is performed in response to simultaneous operation of an accelerator and a brake,
 wherein the processor circuit is configured to reduce the output of the drive source after execution of the upshift.

* * * * *